United States Patent [19]

Settineri

[11] Patent Number: 4,681,986
[45] Date of Patent: Jul. 21, 1987

[54] SPLICE CONSTRUCTION FOR ELECTRICAL CABLE AND METHOD FOR MAKING THE SAME

[75] Inventor: Robert A. Settineri, Gibsonia, Pa.

[73] Assignee: Royston Laboratories, Inc., Pittsburgh, Pa.

[21] Appl. No.: 832,072

[22] Filed: Feb. 24, 1986

[51] Int. Cl.$^4$ .................... H02G 15/08; H02G 1/14
[52] U.S. Cl. ................................ 174/84 R; 29/868; 156/49
[58] Field of Search ............ 174/84 R, 84 C; 156/49; 29/858, 868; 339/114 R, 115 C, 116 C

[56] References Cited

U.S. PATENT DOCUMENTS

| 2,967,795 | 1/1961 | Bollmeier et al. | 174/84 R |
| 3,580,756 | 5/1971 | Kashara et al. | 156/49 |
| 3,691,505 | 9/1972 | Graves | 174/84 R X |
| 3,781,458 | 12/1973 | May | 156/49 X |
| 3,876,454 | 4/1975 | Snell et al. | 174/84 R X |
| 4,107,451 | 8/1978 | Smith, Jr. et al. | 174/84 R |
| 4,411,262 | 10/1983 | Von Bonin et al. | 264/137 |
| 4,427,002 | 1/1984 | Baron et al. | 128/82 X |
| 4,545,830 | 10/1985 | Dienes et al. | 156/49 X |

Primary Examiner—Morris H. Nimmo
Attorney, Agent, or Firm—Andrew F. Kehoe

[57] ABSTRACT

A kit comprising materials for protecting splices of electrical cables. Such splices as must be maintained underground between cables used in providing cathodic protection against corrosion to buried pipelines. The kit contains (a) a malleable butyl rubber composition having good low-temperature brittleness and exhibiting some cold flow characteristics, (b) a restraining fabric impregnated with a curable resin such as moisture-curable polyurethane which is characterized by good shelf life and a controlled curing speed when subjected to moisture. The invention also relates to the novel protected spliced structures which are formed by use of the kit material.

8 Claims, 5 Drawing Figures

SPLICE CONSTRUCTION FOR ELECTRICAL CABLE AND METHOD FOR MAKING THE SAME

BACKGROUND OF THE INVENTION

This invention relates to a means for protecting splices of electrical cable from corrosion and physical abuse. It is particularly valuable for use with splices in cathodic protection systems for buried steel structures such as pipelines.

Cathodic protection systems are used along buried pipelines and for other structures containing petroleum, natural gas, and numerous other materials. It is difficult to provide dependable protection for sp ices of electrical conduits in such systems. The difficulty arises from the corrosive nature of many underground environments on the cathodic protection system on copper metal splices and also physical abuse encountered when the splices are buried underneath the surface.

The problem of providing such splice protection is known and has been addressed by prior inventors. For example, one product is a splice kit consisting of a two-part (split) mold (which must be fitted carefully around a splice to be protected) and an epoxy resin to be used to fill the mold and to encapsulate the splice with a bridge of insulating material over the splice zone between the insulation on the cables to be spliced. In fact, differently-sized splices require the inconvenience of differently-sized kit products to be supplied to the construction or repair sites. Another problem is the normal use of two-part epoxy systems requiring mixing and pouring at the construction site. After such preparation of such mixes curing is to be assured by maintaining a temperature of, typically 40° F., for a period of time during which the curing takes place and during which stress on the splice may interfere with a continuous seal between cable insulation and the insulating splice structure.

The present inventor directed his efforts towards supplying a more convenient splicing system.

SUMMARY OF THE INVENTION

It is a principal object of the present invention to provide an improved splice-insulating structure and means to form such structure.

Another object of the invention is to provide such a splice-insulating means in the form of a kit suitable for use to bridge splices of various sizes.

A further object of the invention is to provide a splice means which can be formed and used conveniently in a wide range of thermal environments.

Other objects of the invention will be obvious to those skilled in the art on their reading of this disclosure.

The above objects have been achieved by the development and construction of an insulating splice sealing structure comprising a kit including a malleable polymeric sealant characterized by some cold-flow properties and a low temperature brittleness of less than −20° C., a restraining fabric, e.g., a hard protective shield means over the malleable sealant formed of a fabric impregnated with a resin. The resin contributes to the hardness of the shield.

In practice, the structure is made readily usable at any construction site by being supplied in small kits which contain small extensible strips of the malleable sealant and a hermetically-sealed restraining fabric already impregnated with a curable resin.

It is also desirable to have a pair of hand-protective gloves in the kit.

A suitable restraining and reinforcing means is an impregnatable and flexible, large mesh fabric such as that known in the art and formed of high-modular yarns, e.g., high-strength, high-modular, low-moisture pickup polyethyleneterephthalate yarn of 1000 denier using 6 wales per inch of width and 13 courses per inch length. This material has a water absorbency of less than 0.5% by weight after drying and subsequent exposure to 65% relative humidity of room temperature. Such a material as described is currently used in some medical applications. It, and many functional equivalents thereof, are described in U.S. Pat. No. 4,427,002. Also described in that patent are some water-curable resin systems useful in the practice of the present invention, i.e, in coating the bandage of the present invention.

Such a material can be a flexible large mesh fabric, preferably knit, defining a lattice of relatively large openings. The smallest dimension of the openings will generally be at least 0.015 sq. in. and preferably a minimum of 0.022 sq. in., more usually not exceeding 0.050 sq. in. The openings may be of any configuration, such as square, rectangular, polygonal, or the like. The opening is large enough so that in the finished product the polymer composition preferably does not form air impervious windows across the openings. Strands of the carrier which define the openings are relatively heavy yarn of 400-1500 denier, preferably 500-1000 denier, most preferably 840-1000 denier.

Materials which may be used include polyester, nylon and polypropylene. Preferably polyester is used, most preferably polyethyleneterephthalate fiber (e.g., DACRON. DuPont). These materials are used in the form of a single fiber comprised of a multiplicity of filaments wound to produce the desired denier. Some significant factors concerning the material are that the material provide structural stability to the final product, that it allow for molding to form the splice structure, that it be wettable by the polymer composition, that it be stable under normal usage, and that it have a low water absorbency. A knit of the Raschel type inherently provides a highly flexible carrier material. Such a preferred knit can be comprised of walewise parallel chains and filling threads having sinuous configuration looped between said chains, said fill thread loops being formed around a link of one of said chains and then around a link of another of said chains, each loop of each fill thread being in a course different from the course in which the other loopings thereof occur and the loops of different fill threads in the same course pointing in the same direction, said fabric being substantially unstretchable in the walewise direction, but substantially stretchable in the direction normal thereto, the fabric containing no more than 20 wales per inch width, preferably 5-20 wales per inch width, and not more than 25 courses per inch length, preferably 10-20 courses per inch length, the weight of the fabric being 0.025-0.090 lbs/linear yard in widths of 2-6 inches. Such bandages extensible in at least one direction are particularly valuable in allowing good contact to be made between the polymer-encapsulated splice and the bandage. This is because the spliced area will often be of irregular shape and it is important that the bandage stretch sufficiently to maintain an effective shielding contact over the splice area.

A curable resin wets, and is impregnated into, or onto, the fabric. The resin, with the fabric, must form a hard, tough, but not brittle, protective shield about the splice site. The resin is conveniently a water-cured system.

There are a large number of curable resin systems which can be utilized: Superior systems not only possess hardness and toughness but, once cured, have resistance to hydrolytic attack. The curable system should be easily spreadable and curable within a short time—but not too short—to finish the shield. Moisture-curable systems are advantageous because their time of cure can be readily predicted without primary dependence on the ambient temperature.

Polyurethane systems described in U.S. Pat. No. 4,427,002 are useful. One such system comprises the cured reaction product of a polyurethane prepolymer formed of the reaction of polypropylene ether diol and polypropylene ether triol with either a diisocyanate or a diisocyanate - carbodiimide precursor. Such systems are readily cured by the presence of moisture. Spraying moisture is a suitable field technique and curing will take about 5 to 10 minutes.

One rubbery material advantageously used to encapsulate and wrap the splice proper is, suitably, a butyl rubber sealant product. One such product is that sold under the trade designation Butyl Rubber Sealant B3ll by Bethel Products Inc. of New Carlisle, Ohio 45344. The material should be malleable, have some cold-flow and adhesive properties that impart a self-healing characteristic to abused splice sites. It is desirable that the sealant has a low-temperature brittleness of at least about −20° F., but sealants with low-temperature brittleness (glass-transition temperature) of −80° F. appear to be readily available and have excellent properties for use in forming splices according to the invention. Favorable materials have some pressure sensitive-adhesive characteristics and this helps them to remain in place during splice formation without dependence on the splice geometry.

ILLUSTRATIVE EMBODIMENT OF THE INVENTION

In this application there is described a preferred embodiment of the invention and suggested various alternatives and modifications thereof, but it is to be understood that these are not intended to be exhaustive and that other changes and modifications can be made within the scope of the invention. These suggestions herein are selected and included for the purposes of illustration in order that others skilled in the art will more fully understand the invention and the principles thereof and will be able to modify it and embody it in a variety of forms, each as may be best suited to the condition of a particular case.

IN THE DRAWINGS

Figure 1:
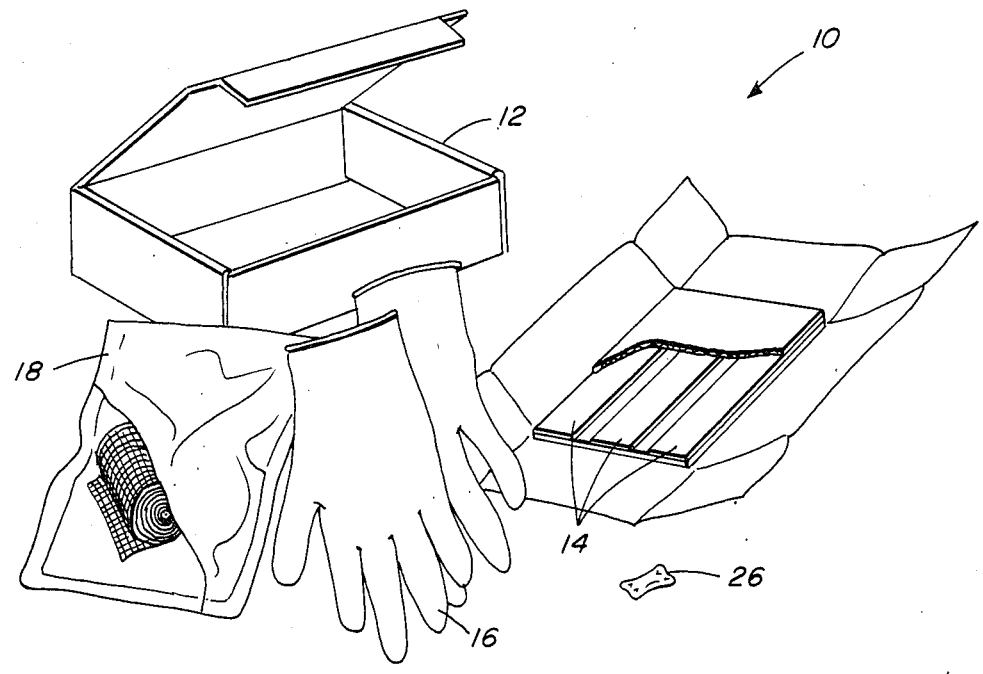
FIG. 1 is an exploded view of a "splice kit" showing the elements included therein.

With further references to the drawings, it is seen that FIG. 1 illustrates an open splice kit 10 comprising a container 12 and, within it, three strips 14 of sealant polymer, a pack of rubber gloves 16 and a sealed bag 18 comprising a restraining fabric impregnated with a moisture-curable polymer system. The system is a cold-water curable polyurethane prepolymer comprising the reaction product of a polyalkylene and a diisocyanate.

Figure 2:
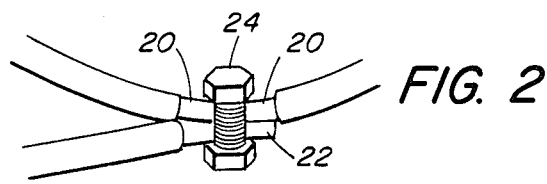
FIG. 2 is a perspective view of a splice before being protected according to the invention.

FIG. 2 illustrates a typical splice between two cables 20 and 22. The splice is held in place by connector 24 which compresses an uninsulated portion of cable 20 against an uninsulated portion of cable 22.

Figure 3:
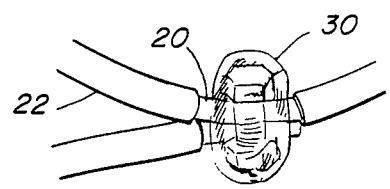
FIG. 3 shows the splice of FIG. 2 with the malleable polymeric sealant squeezed throughout.
Figure 4:
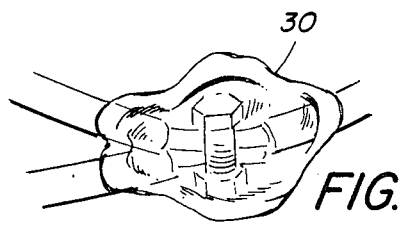
FIG. 4 illustrates sequential strips of an extensible sealant stretched and wound about the splice area and extending to enclose the insulation on the spliced cables.

FIG. 3 shows how the tacky malleable sealant polymer 30 around the splice may be easily hand-molded by squeezing a strip 14 about the irregular geometry of the splice. FIG. 4 shows how the sealant polymer is built up by applying more sealant 30 until there is a continuous seal from the insulation on one side of the splice to insulation on the other side of the splice. The subsequent strips 14 are conveniently stretched and wound about the hand molded sealant to build up a sealing mass 32 as seen in FIG. 4.

Figure 5:
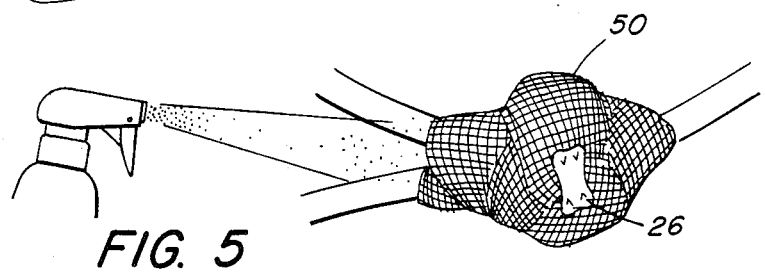
FIG. 5 illustrates the fabric-based reinforcing shield wound about the bandage. Normally the resin will be carried on the bandage, and cured by moisture.

FIG. 5 shows how the reinforcing, or shield-forming fabric 50 is stretched, wound about the sealant, then clipped at 26 to prevent its unwinding and then subjected to a water spray to initiate its hardening.

It is also to be understood that the following claims are intended to cover all of the generic and specific features of the invention herein described and all statements of the scope of the invention which might be said to fall therebetween.

What is claimed is:

1. A kit for use in forming a protective structure encapsulating structure about a splice in electroconductive cables, said kit comprising:
    (a) a plurality of extensible and windable strips of a malleable, hand-moldable polymeric sealand adapted for hand molding about said splice, a sealant being characterized by a cold-flow property and a low-temperature brittleness property of less than −20° C.; and
    (b) a hermetically-sealed container containing a restraining fabric impregnted with a resing which is adapted for winding around said sealant after it is molded about said splice and is curable, by contact with moisture, into a hard, moisture-resistant protective shield means for said sealant.

2. A kit as defined in claim 1 comprising, in addition to said sealant and said container, a pair of hand-protecting gloves.

3. A kit as defined in claim 1 wherein said mositure-curable resin is a curable polyurethane resin system.

4. A kit a defined in claim 3 wherein said polymeric sealant is a butyl rubber sealant.

5. A splice construction as defined in claim 1 wherein said sealant has a pressure-sensitive adhesive property.

6. A splice construction of the type wherein ends from a plurality of electroconductive cables are spliced together by a splicing implement and enclosed within a protective structure, the improvement wherein said protective structure is formed of:
    (a) a malleable, hand -moldable rubber composition molded about the splice itself and substantially enclosing said splicing implement;

(b) at least one strip of a rubber composition being stretched over said hand-moldable rubber position, said strip covering all exposed electroconductive metal of said splice construction; and (c) a hard shield member substantially enclosing all of said rubber composition, said shield member formed of a moisture-cured resin on a fabric matrix.

7. A splice construction as defined in claim 6 wherein said rubber composition has a pressure-sensitive adhesive characteristic.

8. A process for protecting a splice construction of a heavy electroconductive cable of the type used in cathodic protection, said process comprising the steps of:

(a) molding a tacky malleable rubber composition about a splice and substantially enclosing a splice implement;

(b) stretching a strip of said rubber composition over said molded composition to cover all exposed electroconductive metal of said splice construction;

(c) wrapping a fabric impregnated with a coldwater curable resin over said rubber composition; and (d) curing said resin to a hard, protective composition.

9. A splice construction as defined in claim 6 wherein said hand-moldable rubber composition is characterized by a cold-flow property, low-temperature brittleness property of less than $-20°$ C.

10. A splice construction as defined in claim 9 wherein said hand-molded rubber composition is a butyl rubber sealant.

11. A splice construction as defined in claim 10 wherein said low-temperature brittleness property is $-80°$ C.

12. A splice construction as defined in claim 6 wherein each said rubber composition is the same material.

13. A splice construction as defined in claim 10 wherein each said rubber composition is the same material and said material is suitable for both hand-molding and winding and stretching application.

* * * * *

UNITED STATES PATENT AND TRADEMARK OFFICE
CERTIFICATE OF CORRECTION

PATENT NO. : 4,681,986
DATED : 21 July 1987
INVENTOR(S) : Robert A. Settineri

It is certified that error appears in the above—identified patent and that said Letters Patent is hereby corrected as shown below:

Column 1, Line 15 "sp ices" should read --splices--;

Column 4, Line 41 "sealand" should read --sealant--;

Column 5, Line 2 after rubber "position" should read --composition--.

Signed and Sealed this

Fifteenth Day of December, 1987

Attest:

DONALD J. QUIGG

Attesting Officer          Commissioner of Patents and Trademarks